United States Patent
Lee et al.

(10) Patent No.: US 9,515,303 B2
(45) Date of Patent: Dec. 6, 2016

(54) BATTERY PACK

(71) Applicant: SAMSUNG SDI CO., LTD., Yongin-si, Gyeonggi-do (KR)

(72) Inventors: Kye-Youn Lee, Yongin-si (KR); Hee-Youn Won, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/329,892

(22) Filed: Jul. 11, 2014

(65) Prior Publication Data

US 2014/0322562 A1    Oct. 30, 2014

(30) Foreign Application Priority Data

Mar. 27, 2014   (KR) .......................... 10-2014-0036124

(51) Int. Cl.
*H01M 2/10* (2006.01)
*H01M 10/42* (2006.01)
*H01M 10/48* (2006.01)

(52) U.S. Cl.
CPC ......... *H01M 2/1061* (2013.01); *H01M 10/425* (2013.01); *H01M 10/486* (2013.01); *H01M 2200/00* (2013.01)

(58) Field of Classification Search
CPC .... H01M 2/02; H01M 2/0202; H01M 2/0207; H01M 2/021; H01M 2/0212; H01M 2/021504; H01M 2/0404
See application file for complete search history.

(56) References Cited

U.S. PATENT DOCUMENTS

| | | | |
|---|---|---|---|
| 2005/0112415 A1* | 5/2005 | Takeshita ............ | H01M 2/0215 429/7 |
| 2009/0092896 A1* | 4/2009 | Koh et al. ..................... | 429/163 |
| 2009/0258285 A1* | 10/2009 | Kim .............................. | 429/97 |
| 2010/0159287 A1* | 6/2010 | Kwag et al. ..................... | 429/7 |
| 2012/0045666 A1 | 2/2012 | Kwak et al. | |

(Continued)

FOREIGN PATENT DOCUMENTS

| | | |
|---|---|---|
| JP | 2008-27616 A | 2/2008 |
| JP | 4918723 B2 | 2/2012 |

(Continued)

OTHER PUBLICATIONS

Patent Abstracts of Japan No. JP 2009-026631 for JP Publication No. JP 4918723, publication date Feb. 7, 2009, 10 pages.

(Continued)

*Primary Examiner* — Alix Eggerding
(74) *Attorney, Agent, or Firm* — Lewis Roca Rothgerber Christie LLP (57) ABSTRACT

A battery pack includes a plurality of unit cells; a protective circuit module on the plurality of unit cells and coupled to the unit cells, and an upper cover on the protective circuit module and including openings defined in its sides. Each of the unit cells includes a can, an electrode assembly accommodated in the can, a cap plate coupled to the can, and a holder between the unit cell and the protective circuit module and including protrusions coupled to the openings of the upper cover. The unit cells are oriented side by side along a first direction such that the cap plates are exposed along the same direction, and the protective circuit module includes grooves defined in its sides and corresponding to the protrusions of the holder.

19 Claims, 6 Drawing Sheets

(56) References Cited

U.S. PATENT DOCUMENTS

2012/0052331 A1* 3/2012 Park .................. H01M 2/202
                                                    429/7
2012/0106015 A1* 5/2012 Kwak ................ H01M 2/0207
                                                    361/103

FOREIGN PATENT DOCUMENTS

| KR | 10-2009-0011994   | 2/2009  |
|----|-------------------|---------|
| KR | 10-2009-0097267 A | 9/2009  |
| KR | 10-2012-0021943   | 3/2012  |
| KR | 10-2013-0140248   | 12/2013 |

OTHER PUBLICATIONS

KIPO Office action dated Sep. 22, 2014, for Korean priority Patent application 10-2014-0036124, (7 pages).

* cited by examiner

BATTERY PACK

CROSS-REFERENCE TO RELATED APPLICATION

This application claims priority to and the benefit of Korean Patent Application No. 10-2014-0036124, filed on Mar. 27, 2014, in the Korean Intellectual Property Office, the entire disclosure of which is incorporated herein in its by reference.

BACKGROUND

1. Field

Aspects of the present invention relate to a battery pack.

2. Description of the Related Art

With developments in wireless internet and communication technology, use of portable computers using batteries instead of external power supplies has become widespread. Portable computers are small, easy-to-carry, and optimized in terms of mobility, and are thus widely used for business use and personal use. Portable computers may include battery packs instead of external power supplies, allowing them to be used anywhere. This type of battery pack may be made up of a plurality of rechargeable unit cells to supply sufficient output power.

SUMMARY

One or more embodiments of the present invention are directed toward a battery pack.

Additional aspects of the invention will be set forth in part in the description which follows and, in part, will be apparent from the description, or may be learned by practice of the presented embodiments.

According to one or more embodiments of the present invention, a battery pack includes a plurality of unit cells, a protective circuit module on the plurality of unit cells and coupled to the unit cells, and an upper cover on the protective circuit module, the upper cover having openings defined in its sides. Each of the unit cells may include a can, an electrode assembly accommodated in the can, a cap plate coupled to the can; and a holder between the unit cell and the protective circuit module and having protrusions coupled to the openings of the upper cover. The unit cells may be oriented side by side along a first direction such that the cap plates are exposed along the same direction, and the protective circuit module may include grooves in its sides and corresponding to the protrusions of the holder.

The grooves may be in the sides of the protective circuit module along a direction of thickness of the unit cells.

The grooves may include pairs of grooves in the sides of the protective circuit module facing each other, and each pair of grooves may include a first groove and a second groove that are symmetric along a length of the unit cells.

A shortest distance between the first and second grooves may be less than a width of one of the unit cells.

The grooves may alternate in both of the sides of the protective circuit module along a length of the protective circuit module.

The protrusions may overlap the grooves.

The grooves may be within outer surfaces of the cans of each of the unit cells.

The upper cover may further include projections on its lateral walls which may be configured to be coupled to the grooves.

The upper cover may further include first lateral walls extending over the sides of the protective circuit module, and may include second lateral walls extending down from the first lateral walls at least over a portion of the cans.

The first lateral walls may be thicker than the second lateral walls.

Each of the unit cells may include an electrode pin extending towards the protective circuit module.

The holder may be configured to accommodate a temperature device coupled to the electrode pin.

According to one or more embodiments of the present invention, a battery pack includes a plurality of unit cells, a protective circuit module on upper surfaces of the plurality of unit cells and coupled to the unit cells, and an upper cover on the protective circuit module. Each of the unit cells may include an upper surface having a first polarity and an electrode pin having a second polarity that is different from the first polarity, where the electrode pin may extend from the upper surface, and a holder on the upper surface under the protective circuit module. The protective circuit module may include first sections narrower than each of the unit cells, and second sections narrower than the first sections. The first and second sections may alternate.

At least one holder of the battery pack may include a protrusion, and the upper cover may define an opening to which the protrusion is coupled by an interference fit.

The protrusion may be under the second sections.

The first sections may be longer than the second sections.

The upper cover may include projections on its lateral walls. The projections may be supported and may contact outer sides of the second sections.

At least one holder of the battery pack may accommodate a temperature device coupled to the respective electrode pins.

Each of the unit cells may further include a can, an electrode assembly accommodated in the can and having a first electrode plate having the first polarity, a second electrode plate having the second polarity, and a separator between the first and second electrode plates, and a cap plate coupled to the can and on the upper surface of the unit cell.

The unit cells may be oriented side by side along a first direction. The upper cover may have substantially the same length as a total length of the unit cells along the first direction.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. Effects and features of the embodiments, and implementation methods thereof, will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not necessarily modify the individual elements of the list.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first and second" are used to describe various elements, these elements should not be limited by these terms. These terms are only used to distinguish one element from another element.

In the following descriptions of the embodiments, terms indicating a singular form may include plural forms unless specifically referred to or expressed in the contrary.

In the following descriptions of the embodiments, the meaning of "include," "comprise," "including," or "comprising," specifies a property, a region, a fixed number, a step, a process, an element and/or a component but does not exclude other properties, regions, fixed numbers, steps, processes, elements, and/or components.

It will be understood that when a film, a region, or an element is referred to as being "above," or "on" another film, region, or element, it can be directly on the other film, region, or element, or intervening films, regions, and/or elements may also be present.

In the drawings, the sizes of elements may be exaggerated for clarity. For example, in the drawings, the size or thickness of each element may be arbitrarily shown for illustrative purpose, and thus the present invention should not be construed as being limited thereto.

Figure 1:
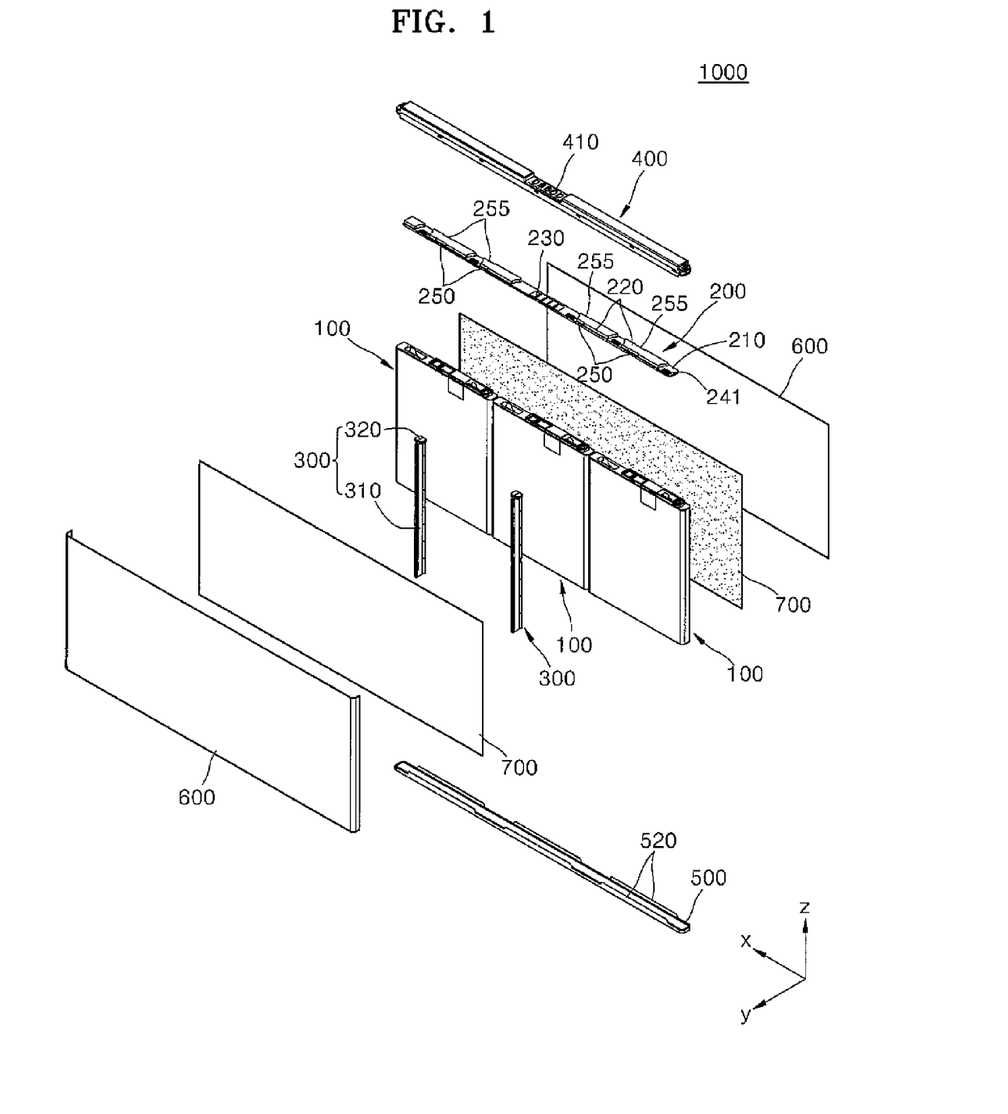
FIG. 1 is an exploded perspective view illustrating a battery pack according to an embodiment of the present invention.
Figure 2:
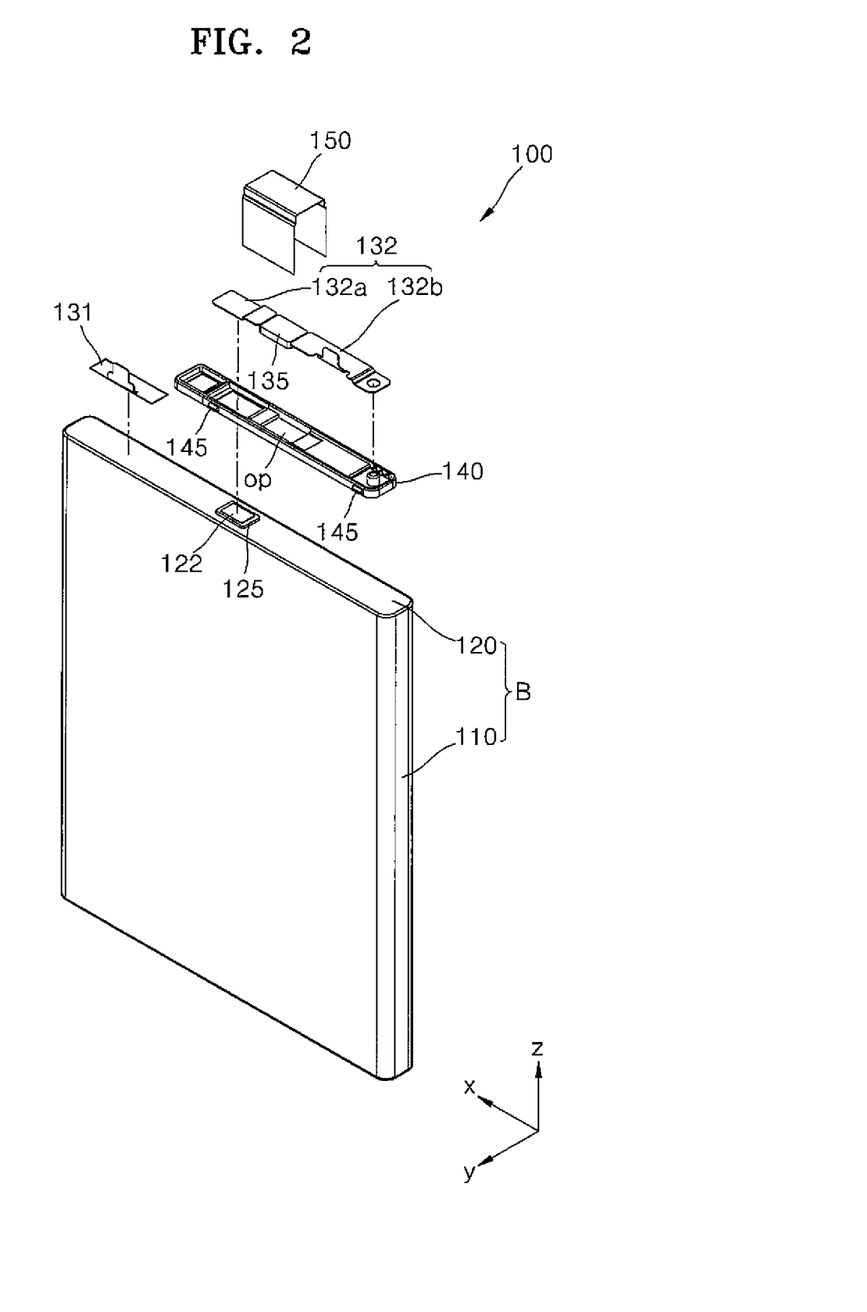
FIG. 2 is an exploded perspective view illustrating a unit cell of the battery pack illustrated in FIG. 1.
Figure 3:
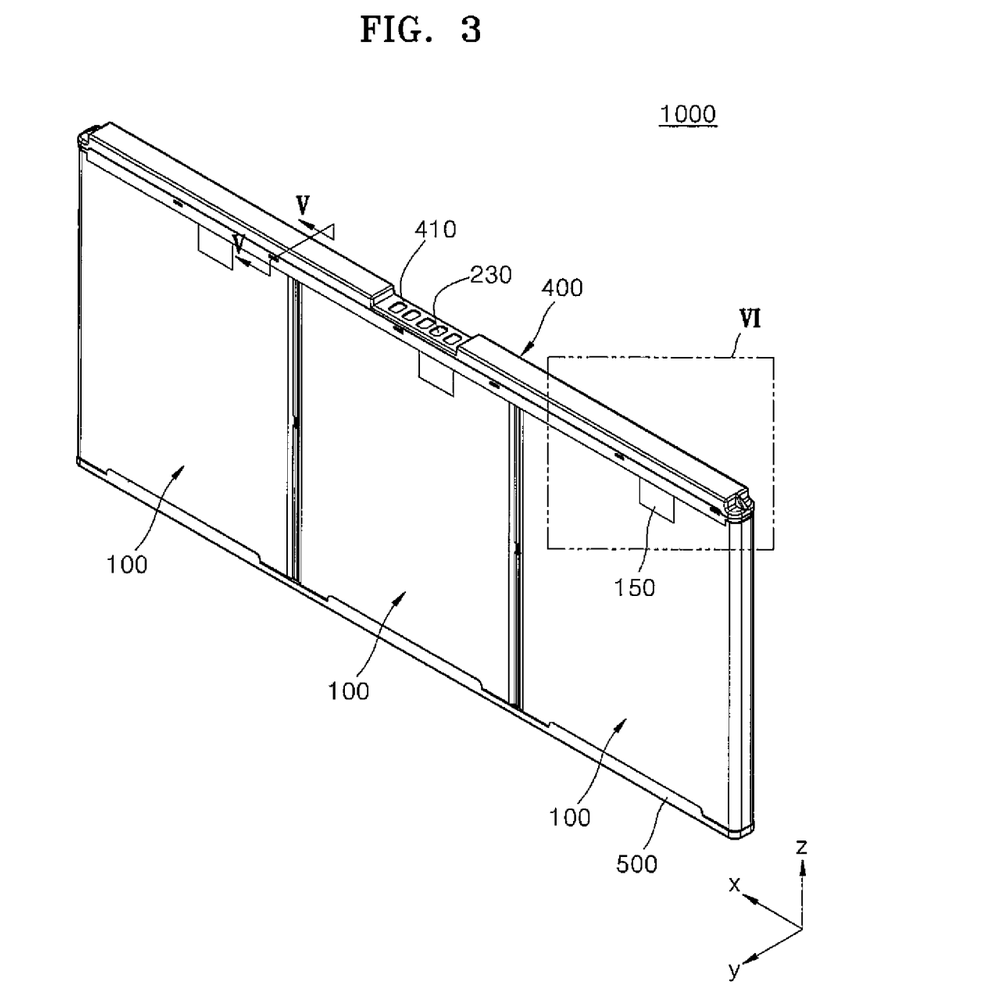
FIG. 3 is a perspective view illustrating the unit cells in an assembled state, a protective circuit module, an upper cover, and a lower cover of the battery pack illustrated in FIG. 1.

FIG. 1 is an exploded perspective view illustrating a battery pack 1000 according to an embodiment of the present invention. FIG. 2 is an exploded perspective view illustrating a unit cell 100 and a holder 140 of the battery pack 1000 illustrated in FIG. 1. FIG. 3 is a perspective view illustrating the unit cells 100 in an assembled state, a protective circuit module 200, an upper cover 400, and a lower cover 500 of the battery pack 1000 illustrated in FIG. 1.

Referring to the embodiments illustrated in FIGS. 1 through 3, the battery pack 1000 may include unit cells 100, a protective circuit module 200 electrically coupled to the unit cells 100, spacers 300 electrically insulating the unit cells 100 from each other, an upper cover 400, a lower cover 500, labels 600, and insulation film 700.

The unit cells 100 may be arranged side by side along a first direction (e.g., x-axis direction). For example, the unit cells 100 may be arranged side by side with upper surfaces of the unit cells 100 facing upward. In this embodiment, lateral surfaces of neighboring pairs of unit cells 100 may face each other. The unit cells 100, according to an embodiment, may be rechargeable lithium-ion battery cells.

Referring to the embodiment shown in FIG. 2, each of the unit cells 100 may include a bare cell B and a holder 140 fixed or coupled to an upper portion of the bare cell B.

The bare cell B, in this embodiment, may include a can 110 having an opening to accommodate an electrode assembly, an electrode assembly insertable into the can 110 through the opening, a cap plate 120 coupled to the can 110 to cover the opening, and an electrode pin 122 on the cap plate 120.

The can 110 may have a hexahedral shape with an open top side and may be formed of a high-strength metallic material, according to an embodiment. For example, the can 110 may be formed of aluminum or an aluminum alloy. After the electrode assembly is inserted into the can 110, according to an embodiment, the opening of the can 110 may be hermetically sealed at the cap plate 120. Like the can 110, the cap plate 120, according to an embodiment, may be formed of a metallic material such as aluminum or an aluminum alloy. Boundaries between the cap plate 120 and the can 110 may be welded together, for example, using a laser to seal the inside of the can 110.

According to an embodiment, the electrode assembly may include first and second electrode plates coated with electrode active materials, and a separator between the first and second electrode plates. The first and second electrode plates, in this embodiment, have different polarities. The electrode assembly may be formed by sequentially stacking the first electrode plate, the separator, and the second electrode plate, and winding them in the form of a jelly roll, according to an embodiment.

In an embodiment, the electrode assembly has a jelly roll shape. However, the embodiments of the present invention are not limited thereto. For example, in another embodiment, a first electrode plate, a separator, and a second electrode plate may be sequentially stacked to form the electrode assembly.

The electrode pin 122, according to an embodiment, is on the cap plate 120. The first electrode plate may be electrically connected or coupled to the cap plate 120, and the second electrode plate may be electrically connected or coupled to the electrode pin 122. Since the first and second electrode plates have different polarities, according to an embodiment, the electrode pin 122 and the cap plate 120 have different polarities. For example, the electrode pin 122 may have a negative polarity, and the cap plate 120 may have a positive polarity. A gasket 125 may be between the electrode pin 122 and the cap plate 120 to prevent a short circuit, according to an embodiment. In an embodiment, the gasket 125 is formed of an insulation material for preventing a short circuit between the electrode pin 122 and the cap plate 120.

The unit cell 100, according to an embodiment, may include a first electrode tab 131 and a second electrode tab 132. The first and second electrode tabs 131 and 132 may function as a positive terminal and a negative terminal, respectively of the unit cell 100.

In an embodiment, the first electrode tab 131 may be on the cap plate 120 and electrically connected or coupled to the cap plate 120, for example, by welding. In an embodiment where the cap plate 120 has a positive polarity, the first electrode tab 131 welded on the cap plate 120 may have a positive polarity.

In an embodiment, the second electrode tab 132 may be connected to the electrode pin 122 and a temperature device 135, for example, a temperature cutoff (TCO) device. In an embodiment, the second electrode tab 132 may include a first part 132a and a second part 132b. A first end of the first part 132a may be coupled to the electrode pin 122, and the opposite end of the first part 132a may be coupled to the temperature device 135. In an embodiment, one end of the second part 132b may be coupled to the temperature device 135. Thus, in this embodiment, the second electrode tab 132 may be electrically connected or coupled to the temperature device 135 and the electrode pin 122.

In an embodiment, the first and second electrode tabs 131 and 132 are on the cap plate 120. In an embodiment where the cap plate 120 has a positive polarity, the second electrode tab 132 having a negative polarity may be short-circuited with the cap plate 120, thus, according to this embodiment, the second electrode tab 132 is on the holder 140 placed on the cap plate 120.

The holder 140 may accommodate the second electrode tab 132 and the temperature device 135. The holder 140 may include an opening OP at a position corresponding to the position of the temperature device 135 such that the temperature device 135 may operate according to the temperature of the unit cell 100.

The holder 140 in which the second electrode tab 132 and the temperature device 135 are accommodated may be fixed or coupled to the unit cell 100 using a fixing material 150, e.g., a piece of tape.

Figure 5:
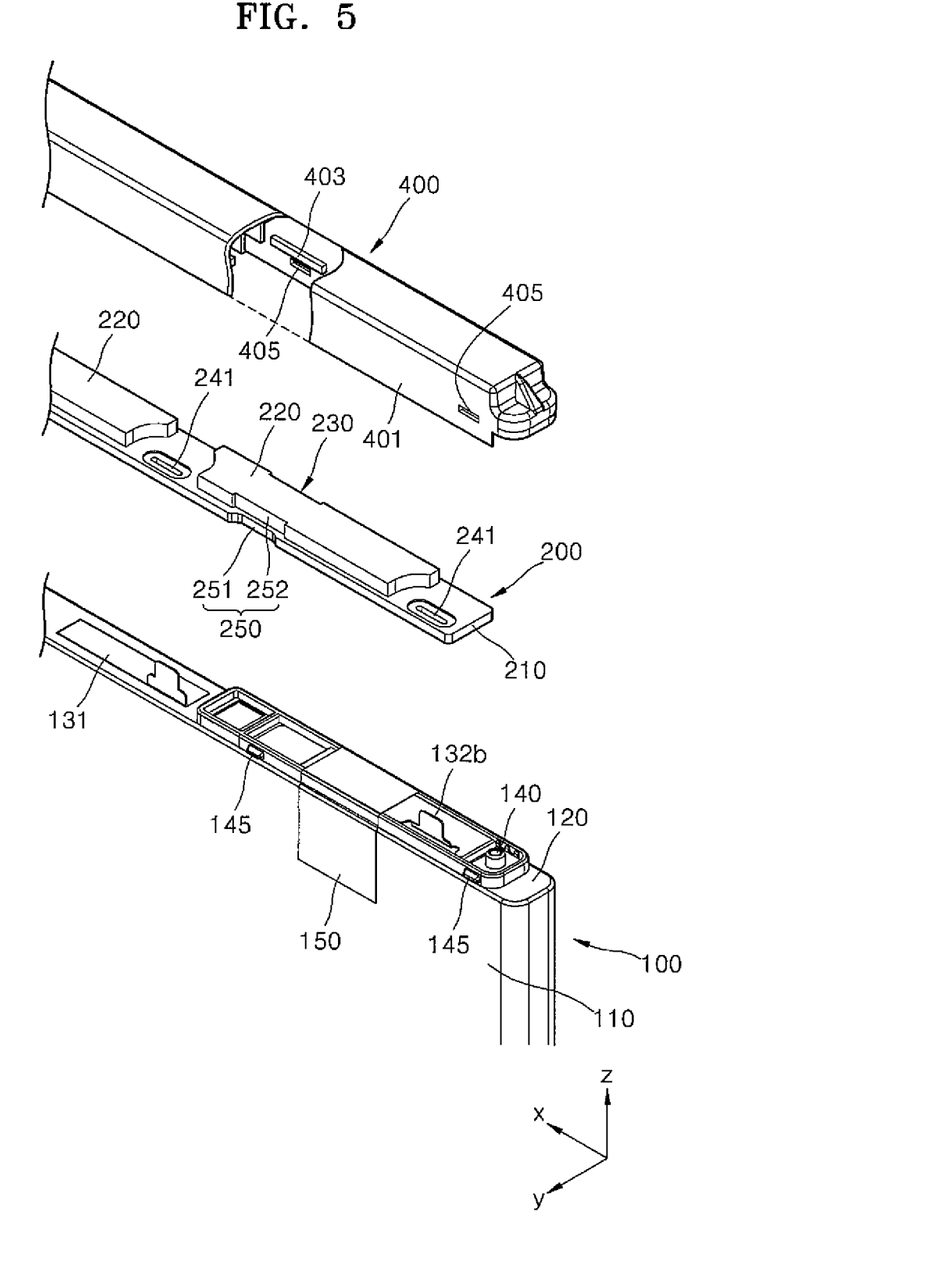
FIG. 5 is an exploded perspective view of a portion of the assembled unit cells illustrated in FIG. 3 as indicated by section IV in FIG. 3.
Figure 6:
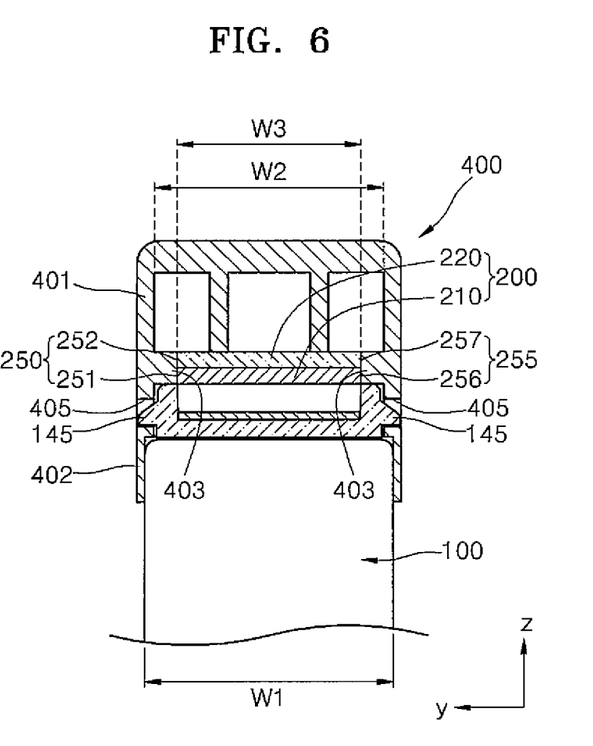
FIG. 6 is a cross-sectional view of the upper cover of one of the unit cells illustrated in FIG. 3 taken along the line V-V of FIG. 3.

The holder 140, according to an embodiment, may include protrusions 145. The protrusions 145 may protrude and extend along a thickness of the unit cell 100 (e.g., y-axis direction) and may be coupled to openings 405 (as shown in FIGS. 5 and 6) of the upper cover 400. For example, the protrusions 145 of the holder 140 may be coupled to the openings 405 of the upper cover 400 using an interference fit method.

In an embodiment, the protrusions 145 are on the holder 140, and the openings 405 are defined in the upper cover 400. However, the embodiments of the present invention are not limited thereto. For example, in another embodiment, openings 405 defined in the holder 140 and protrusions 145 on the upper cover 400 may be coupled to each other by an interference fit method. However, in an embodiment where the protrusions 145 are on the holder 140 and the openings 405 are in the upper cover 400, a thickness of the battery pack 1000 may be reduced.

Referring to the embodiments shown in FIGS. 1 through 3, the protective circuit module 200 may be on the upper surfaces of the unit cells 100, for example, on the cap plates 120 of the unit cells 100, and may be electrically connected or coupled to the unit cells 100 to control charging and discharging of the unit cells 100. The protective circuit module 200, according to an embodiment, may prevent or reduce overheating and explosions caused by overcharging, over-discharging, or overcurrents of the unit cells 100. The protective circuit module 200, according to an embodiment, is on the upper surfaces of the unit cells 100, and the upper cover 400 extends over the protective circuit module 200. The protective circuit module 200, in an embodiment, has a width W2 or W3 (shown in FIG. 4A) less than a width W1 (shown in FIG. 6) of each of the unit cells 100.

The protective circuit module 200 may include a circuit board 210, protection devices 220 on the circuit board 210, and external terminals 230. The circuit board 210, in this embodiment, extends along the direction that the unit cells 100 are arranged. The protection devices 220, in these embodiments, may include safety devices or integrated circuits that are constituted by passive elements such as resistors and condensers or active elements such as transistors.

The circuit board 210 may include connection openings 241. The first and second electrode tabs 131 and 132 of the unit cells 100 may be inserted into the connection openings 241 of the circuit board 210 and may be coupled, e.g., soldered to the circuit board 210. The circuit board 210, in an embodiment, includes a pattern through which the unit cells 100 may be connected in series and/or in parallel. Thus, in an embodiment where the first and second electrode tabs 131 and 132 of the unit cells 100 are connected to the circuit board 210 through the connection openings 241, charging and discharging of the unit cells 100 may be controlled by operations of the protection devices 220, and the unit cells 100 may be connected in series and/or in parallel.

The protective circuit module 200 may include grooves 260 (shown in FIG. 4A) defined in surfaces of the protective circuit module 200 and corresponding to the protrusions 145 of the holder 140. In detail, the grooves 260 may be concavely defined in lateral surfaces of the circuit board 210 and the protection devices 220 along a thickness (e.g., y-axis or second direction) of the unit cells 100 and may be at an inside of the outer surfaces of the cans 110 of the unit cells 100.

The grooves 260 may overlap the protrusions 145. In an embodiment, the protrusions 145 may be located under the grooves 260 and included within regions of the grooves 260. Projections 403 (shown in FIG. 5) of the upper cover 400 may be inserted into the grooves 260 to increase the coupling strength between the protective circuit module 200 and the upper cover 400, which is described in further detail below.

The spacers 300, according to an embodiment, are between unit cells 100, and ends of the spacers 300 may extend toward the protective circuit module 200 to support the protective circuit module 200. In an embodiment, the spacers 300 may include first parts 310 between the unit cells 100, and second parts 320 extending from the first parts 310 toward the protective circuit module 200.

The first parts 310 of the spacers 300, according to an embodiment, may electrically insulate the unit cells 100 from each other. As described with reference to the embodiment illustrated in FIG. 2, the cans 110 and the cap plates 120 of the unit cells 100 may be formed of metallic materials, and the cans 110 and the cap plates 120 may be welded together. Thus, in this embodiment, the cans 110 and the cap plates 120 may have the same polarity. In battery packs where the unit cells 100 are arranged side by side, for example as shown in FIG. 1, unnecessary electrical connections may be made between the unit cells 100, thus, positioning the spacers 300 between the unit cells 100, according to an embodiment, may help reduce or prevent unnecessary electrical connections between the unit cells 100.

The second parts 320 of the spacers 300 may be positioned within a space (or gap) between the protective circuit module 200 and the unit cells 100, and may support the protective circuit module 200. The unit cells 100, in an embodiment, include the electrode pins 122 protruding upward, and the holders 140 on the unit cells 100, thus creating a space between the protective circuit module 200 and the upper surfaces of the unit cells 100. The second parts 320 of the spacers 300, according to this embodiment, may be positioned within the space to support and protect the protective circuit module 200.

The upper cover 400, according to an embodiment, may be on the protective circuit module 200. The upper cover 400 may include openings 410 to expose the external terminals 230 of the protective circuit module 200.

In an embodiment, the upper cover 400 may have substantially the same length as the total length of the unit cells 100 arranged side by side along the first direction. The upper cover 400 may be coupled to the unit cells 100 with the protective circuit module 200 therebetween. In an embodiment, as described above, the upper cover 400 may be coupled to the holders 140 of the unit cells 100 using an interference fit method.

Figure 4A:
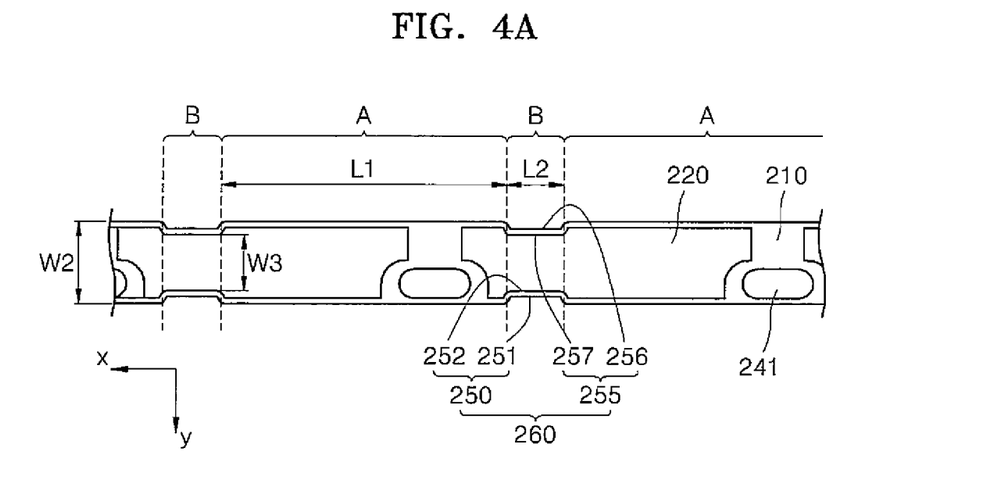
FIG. 4A is a plan view illustrating a protective circuit module of the battery pack illustrated in FIG. 1, according to an embodiment of the present invention.

Referring to the embodiment shown in FIG. 6, the upper cover 400 may include first lateral walls 401 extending over lateral sides of the protective circuit module 200 and second lateral walls 402 extending down from the first lateral walls 401 to cover at least a portion of the respective can 110 of the respective unit cell 100. The first lateral walls 401 may be thicker than the second lateral walls 402, in an embodiment. In an embodiment where the width W2 or W3 of the protective circuit module 200 is less than the width W1 of each unit cell 100, inner sides of the first lateral walls 401 are thicker than inner sides of the second lateral walls 402 such that the upper cover 400 may a have flat outer surface.

In this embodiment, the first lateral walls 401 extend over the lateral sides of the protective circuit module 200 and lateral sides of the holders 140, and the openings 405 defined in the upper cover 400 for coupling with the protrusions 145 of the holders 140 by, e.g, an interference fit method, may be defined in the first lateral walls 401. The first lateral walls 401 may include the projections 403, and the projections 403 may be inserted into the grooves 260 and supported in the grooves 260. In this embodiment, the grooves 260 are located above the protrusions 145 and the projections 403 may be located above the openings 405.

The second lateral walls 402, in an embodiment, extend over the unit cells 100. The second lateral walls 402 may be brought into contact with and supported on upper ends of the respective cans 110 of the unit cells 100 to prevent substances such as dust and liquids from entering the battery pack 1000.

The lower cover 500 may be located at a side of the battery pack 1000 opposite the upper cover 400. The upper cover 400 extends over the upper surfaces of the unit cells 100 with the protective circuit module 200 positioned therebetween, and the lower cover 500 extends over the lower surfaces of the unit cells 100, according to an embodiment.

The labels 600 may cover lateral sides of the unit cells 100. For example, the labels 600 may be attached to the lateral sides of the unit cells 100. The insulation films 700 may be between the labels 600 and the lateral sides of the unit cells 100.

Portions of the labels 600 may be attached to the upper cover 400 and the lower cover 500. In this embodiment, the second lateral walls 402 of the upper cover 400 may extend toward the unit cells 100. In addition, the lower cover 500 may include skirts 520 extending toward the unit cells 100. In this embodiment, portions of the labels 600 are attached to the second lateral walls 402 and the skirts 520, and the unit cells 100 may be insulated and prevented from exposure due to the upper cover 400, the lower cover 500, and the labels 600.

Hereinafter, the protective circuit module 200 will be described in furthere detail with reference to FIGS. 4A and 4B.

Figure 4B:
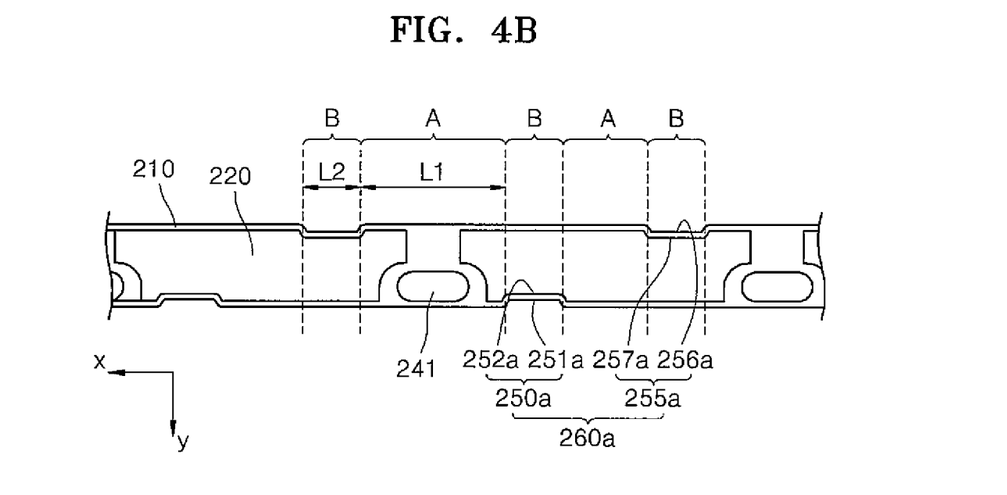
FIG. 4B is a plan view illustrating a protective circuit module of the battery pack illustrated in FIG. 1, according to another embodiment of the present invention.

FIG. 4A is a plan view illustrating the protective circuit module 200 of the battery pack 1000 illustrated in FIG. 1, according to an embodiment of the present invention, and FIG. 4B is a plan view illustrating the protective circuit module 200 of the battery pack 1000 illustrated in FIG. 1, according to another embodiment of the present invention.

Referring to the embodiment illustrated in FIG. 4A, the grooves 260 of the protective circuit module 200 may be in lateral sides of the protective circuit module 200 and may be positioned in pairs to face each other. Each pair, in this embodiment, includes a first groove 250 and a second groove 255 that are symmetric along a length of the protective circuit module 200. The shortest distance W3 between the first and second grooves 250 and 255, in this embodiment, is less than the width W1 of the unit cells 100. In this embodiment, the grooves 260 are in pairs facing each other, and a coupling strength between the projections 403 of the upper cover 400 and the grooves 260 of the protective circuit module 200 may be symmetrical. In an embodiment, the coupling strength between the upper cover 400 and the protective circuit module 200 may be higher at positions of the grooves 260. According to these embodiments, increasing the coupling strength between the grooves 260 and the projections 403 may enhance durability of the battery pack 1000. In an embodiment, the width of the upper cover 400 may be reduced resulting in a slimmer battery pack 1000.

Referring to the embodiment illustrated in FIG. 4B, grooves 260a may be alternately defined in both lateral sides of the protective circuit module 200 in a staggered pattern. In an embodiment, first grooves 250a may be defined in a lateral side of the protective circuit module 200, and second grooves 255a may be defined in the opposite lateral side of the protective circuit module 200 such that the first and second grooves 250a and 255a are staggered along the length of the protective circuit module 200. In this embodiment, first and second lower grooves 251a and 256a may be defined in regions of the circuit board 210 in which the protection devices 220 are located, and first and second upper grooves 252a and 257a may be defined in the protection devices 220.

In this embodiment, the grooves 260a are staggered, and, thus, the coupling strength between the projections 403 of the upper cover 400 and the grooves 260a of the protective circuit module 200 may be distributed such that the coupling strength between the projections 403 and the grooves 260a may be distributed over the unit cells 100, thus increasing durability of the battery pack 1000. In an embodiment, the width of the upper cover 400 may be reduced resulting in a slimmer battery pack 1000.

The grooves 260, according to an embodiment, may be defined in the circuit board 210 and/or the protection devices 220. In an embodiment, first and second lower grooves 251 and 256 may be defined in regions of the circuit board 210 in which the protection devices 220 are located, and first and second upper grooves 252 and 257 may be defined in the protection devices 220. In an embodiment, first and second grooves 250 and 255 may be defined in regions of the circuit board 210 in which the protection devices 220 are not located.

First sections A and second sections B of the protective circuit module 200 may be alternately arranged along a length of the protective circuit module 200, as shown in FIGS. 4A and 4B. The first sections A, in an embodiment, have a width W2 that is less than the width W1 of the unit cells 100. The second sections B, in an embodiment, have a width W3 that is less than the width W2 of the first sections A. Furthermore, along the length of the protective circuit module 200, the first sections A may have a length L1 longer than a length L2 of the second sections B.

The second sections B may be above the protrusions 145 increasing the amount of engagement between the protrusions 145 and the openings 405, and resulting in thinner lateral walls of the upper cover 400 and an overall slimmer upper cover 400. In an embodiment, where the engagement between the protrusions 145 and the openings 405 is increased due to the second sections B, durability of the upper cover 400 and the protective circuit module 200 may be enhanced.

In an embodiment, the second sections B may be above the protrusions 145, and outer sides of the second sections B may contact the projections 403. In this embodiment, the protective circuit module 200 may be supported by the upper cover 400. In this embodiment, the projections 403 may be inserted into the second sections B between the first sections A.

Coupling between the upper cover 400 and the unit cells 100, for example, coupling among the upper cover 400 and the holders 140 of the unit cells 100 and the protective circuit module 200 will now be described with reference to FIGS. 5 and 6.

FIG. 5 is an exploded perspective view of a portion of the assembled unit cells 100 illustrated in FIG. 3 as indicated by section IV in FIG. 3, and FIG. 6 is a cross-sectional view of the upper cover 400 of one of the unit cells 100 illustrated in FIG. 3 taken along the line V-V of FIG. 3.

Referring to the embodiments illustrated in FIGS. 5 and 6, the protective circuit module 200 is positioned on the unit cells 100, and the upper cover 400 is on the protective circuit module 200. In an embodiment, the protective circuit module 200 may be on the cap plates 120 on which the electrode pins 122 are formed. The first and second electrode tabs 131 and 132 of the unit cells 100 may be inserted into the connection openings 241 of the circuit board 210 and may be electrically connected or coupled to the protective circuit module 200, e.g., by soldering.

The upper cover 400 may be coupled to the unit cells 100 with the protective circuit module 200 therebetween. In an embodiment, the openings 405 may be defined in the upper cover 400, and the protrusions 145 may be defined in holders 140 of the unit cells 100. The upper cover 400 and the holders 140 may be coupled by inserting the protrusions 145 into the openings 405, e.g., using an interference fit method. The protrusions 145 may protrude and extend along a direction of thickness of the unit cells 100 (e.g., the y-axis direction) and may be coupled to the openings 405 of the upper cover 400.

In an embodiment, the upper cover 400 may include the projections 403, and the protective circuit module 200 may include the grooves 260. The projections 403 may protrude and extend along a direction of thickness of the unit cells 100 (e.g., y-axis direction) and may be coupled to the grooves 260 of the protective circuit module 200. In this embodiment, the projections 403 are inserted into the grooves 260, thus increasing the coupling strength between the protective circuit module 200 and the upper cover 400.

In an embodiment, in the protective circuit module 200, the first sections A may have a width W2 that is less than the width W1 of the unit cells 100, and the second sections B may have a width W3 that is less than the width W2 of the first sections A. The first sections A and the second sections B may be alternately arranged. In this embodiment, the projections 403 support the protective circuit module 200 while contacting the outer sides of the second sections B, thus increasing the coupling strength between the protective circuit module 200 and the upper cover 400.

With advances in electronic technology, the electronic device market has expanded, and, thus, demand for batteries for electronic devices has increased. Particularly, demand for slim battery packs has increased to reduce the size of electronic devices while maintaining or improving the capacity of batteries.

In the battery pack 1000 of an embodiment of the present invention, the grooves 260 are defined in the lateral sides of the protective circuit module 200 to increase the amount of engagement between the upper cover 400 and the protective circuit module 200. Therefore, the width of the upper cover 400 may be reduced resulting in a slimmer battery pack 1000. In this embodiment, the coupling strength between the upper cover 400 and the protective circuit module 200 is increased, resulting in an increase in the durability of the battery pack 1000.

Furthermore, in an embodiment, the protrusions 403 defined on the lateral walls of the upper cover 400 are inserted into the grooves 260 of the protective circuit module 200, resulting in increased coupling strength between the upper cover 400 and the protective circuit module 200. Therefore, the width of the upper cover 400 may be reduced, resulting in a slimmer battery pack 1000, according to an embodiment.

In an embodiment, the protective circuit module 200 has a thickness varying along its length direction, thus increasing the amount of engagement between the upper cover 400 and the protective circuit module 200, and, thus, improving the coupling strength between the upper cover 400 and the protective circuit module 200. Therefore, according to this embodiment, the width of the upper cover 400 may be reduced, resulting in a slimmer battery pack 1000.

As described above, according to one or more embodiments of the present invention, battery packs that are easy to assemble and having a slim shape are provided.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:
1. A battery pack comprising:
a plurality of unit cells;
a protective circuit module on the plurality of unit cells and coupled to the unit cells, the protective circuit module comprising a circuit board having first connection openings and second connection openings, and protection devices mounted on the circuit board; and
an upper cover on the protective circuit module, the upper cover having openings at its lateral walls, and comprising a projection on one of its lateral walls,
wherein each of the unit cells comprises:
a can, an electrode assembly accommodated in the can, and a cap plate coupled to the can;
a first electrode tab;

a second electrode tab; and
a holder between the unit cell and the protective circuit module and comprising protrusions protruding from its lateral walls in a second direction corresponding to a thickness direction of the unit cells,
wherein the unit cells are oriented side by side along a first direction such that the cap plates are exposed along the same direction,
wherein the circuit board comprises lower grooves in its sides and corresponding to the protrusions of the holder, and
wherein the protection devices comprise upper grooves in their respective sides, the upper grooves being arranged above the lower grooves of the circuit board,
wherein the lower grooves and the upper grooves are positioned above the protrusions along a third direction corresponding to a height direction of the unit cells,
wherein a respective one of the lower grooves and a respective one of the upper grooves are correspondingly shaped to engage the projection,
wherein the projection is inserted in the respective one of the lower grooves and the respective one of the upper grooves when the protrusions are coupled to the openings, and
wherein the first electrode tabs are received in the first connection openings and the second electrode tabs are received in the second connection openings.

2. The battery pack of claim 1, wherein the lower grooves or the upper grooves are in the sides of the protective circuit module along the second direction.

3. The battery pack of claim 1, wherein each of the lower grooves or the upper grooves comprise pairs of grooves in the sides of the protective circuit module facing each other, and each pair of grooves comprises a first groove and a second groove that are symmetric along a length of the unit cells.

4. The battery pack of claim 3, wherein a shortest distance between the first and second grooves is less than a width of one of the unit cells.

5. The battery pack of claim 1, wherein the lower grooves or the upper grooves alternate in both of the sides of the protective circuit module along a length of the protective circuit module.

6. The battery pack of claim 1, wherein the protrusions overlap the lower grooves or the upper grooves.

7. The battery pack of claim 1, wherein the lower grooves or the upper grooves are within outer surfaces of the cans of each of the unit cells.

8. The battery pack of claim 1, wherein the upper cover further comprises:
first lateral walls extending over the sides of the protective circuit module; and
second lateral walls extending down from the first lateral walls at least over a portion of the cans.

9. The secondary battery of claim 8, wherein the first lateral walls are thicker than the second lateral walls.

10. The battery pack of claim 1, wherein each of the unit cells comprises an electrode pin extending towards the protective circuit module.

11. The battery pack of claim 10, wherein the holder is configured to accommodate a temperature device coupled to the electrode pin.

12. A battery pack comprising:
a plurality of unit cells, each of the unit cells comprising:
an upper surface having a first polarity and an electrode pin having a second polarity that is different from the first polarity, the electrode pin extending from the upper surface;
a first electrode tab;
a second electrode tab connected to the electrode pin; and
a holder on the upper surface;
a protective circuit module on the upper surfaces of the plurality of unit cells, the protective circuit module being coupled to the unit cells and being above the holder of each of the unit cells; and
an upper cover on the protective circuit module, wherein the upper cover comprises projections on its lateral walls that project from the lateral walls in a second direction corresponding to a thickness direction of the unit cells, and wherein the protective circuit module comprises:
first sections narrower than each of the unit cells, the first sections having first connection openings and second connection openings;
second sections narrower than the first sections, the second sections comprising a circuit board and protection devices mounted on the circuit board, and the protection devices of the second sections being narrower than the circuit board of the second sections;
wherein the first and second sections alternate,
wherein the projections are supported by and contact outer sides of the second sections, and
wherein the first electrode tabs are received in the first connection openings and the second electrode tabs are received in the second connection openings.

13. The battery pack of claim 12, wherein at least one holder of the battery pack comprises a protrusion, and the upper cover defines an opening to which the protrusion is coupled by an interference fit.

14. The battery pack of claim 13, wherein the protrusion is under one of the second sections.

15. The battery pack of claim 12, wherein the first sections are longer than the second sections.

16. The battery pack of claim 12, wherein at least one holder of the battery pack accommodates a temperature device coupled to the respective electrode pins.

17. The battery pack of claim 12, wherein each of the unit cells further comprises:
a can;
an electrode assembly accommodated in the can and comprising a first electrode plate having the first polarity, a second electrode plate having the second polarity, and a separator between the first and second electrode plates; and
a cap plate coupled to the can and on the upper surface of the unit cell.

18. The battery pack of claim 12, wherein the unit cells are oriented side by side along a first direction, and
wherein the upper cover has substantially the same length as a total length of the unit cells along the first direction.

19. The battery pack of claim 1, wherein a length of the lower grooves or the upper grooves in the first direction is greater than a length of the protrusions in the first direction.

* * * * *